L. H. SCHULZE.
CLAMP PRINCIPALLY FOR COLTER ADJUSTMENT.
APPLICATION FILED MAY 5, 1920.
1,420,451.
Patented June 20, 1922.
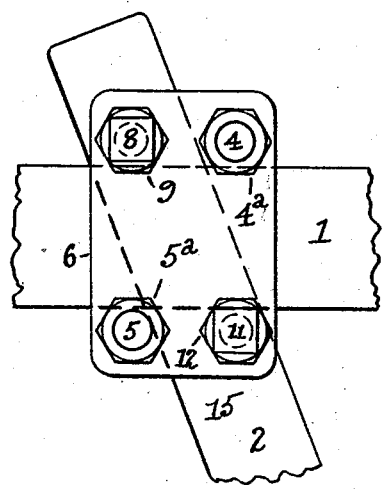
Fig. 1
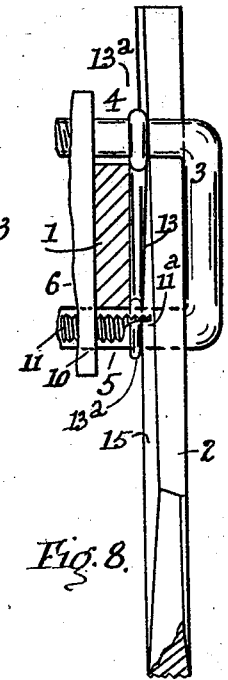
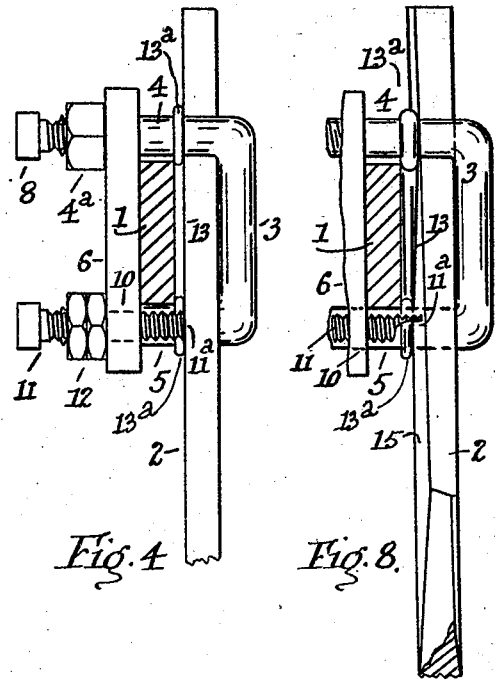
Fig. 4  Fig. 8
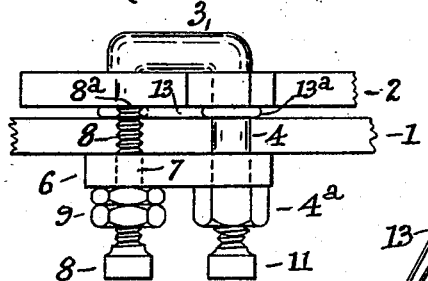
Fig. 2
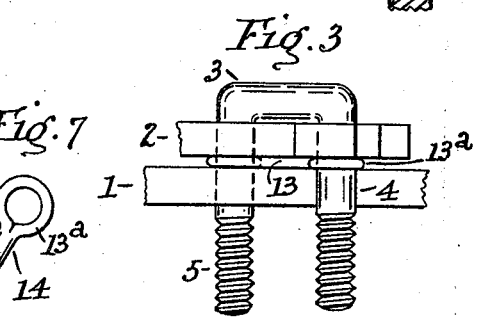
Fig. 7  Fig. 3
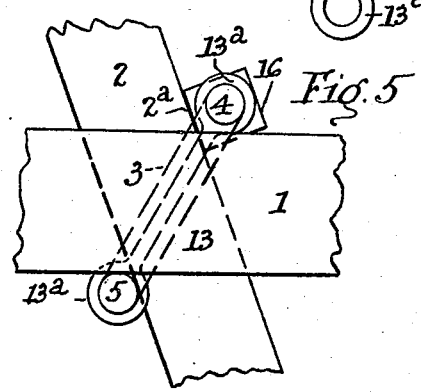
Fig. 5
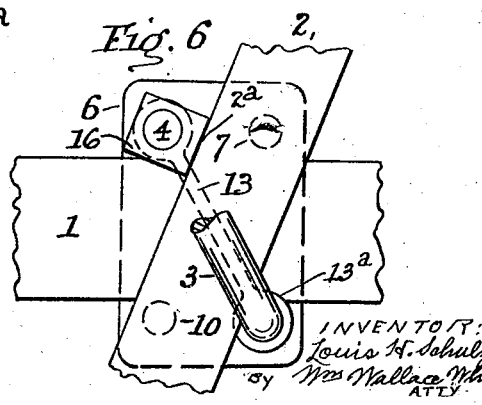
Fig. 6
INVENTOR:
Louis H. Schulze
By Wm Wallace White
ATTY

UNITED STATES PATENT OFFICE.

LOUIS HERMANN SCHULZE, OF GROVEDALE, VIA GEELONG, VICTORIA, AUSTRALIA, ASSIGNOR OF THREE-FIFTHS TO ADOLPH POHL, OF GROVEDALE, VICTORIA, AUSTRALIA.

CLAMP PRINCIPALLY FOR COLTER ADJUSTMENT.

1,420,451.     Specification of Letters Patent.     Patented June 20, 1922.

Application filed May 5, 1920. Serial No. 379,149.

*To all whom it may concern:*

Be it known that I, LOUIS HERMANN SCHULZE, a subject of the King of Great Britain and Ireland, etc., residing at Grovedale, via Geelong, in the State of Victoria, Commonwealth of Australia, have invented certain new and useful Improvements in Clamps Principally for Colter Adjustment; and I do hereby declare the following to be a full, clear, and exact description of the invention, such as will enable others skilled in the art to which it appertains to make and use the same.

The invention provides clamping devices for adjusting the angular inclination or set of plough colters, sub-soiler standards, and so forth.

When a plough colter, which has its adjustment regulated by the usual wedges, meets a strong obstruction which displaces the colter bad ploughing and other disadvantages follow, including loss of time in order to reset the colter.

By this invention the colter is firmly adjusted without employing the usual wedges, and displacements will not occur or will be fewer, while adjustment is more conveniently effected than if the said wedges were used. The invention allows of adjusting not only ordinary bar colters, but also disc colters or any like pillars or standards of tilling implements which need such clamping devices. Any pillar not possessed of suitable surfaces for the contact of the set screws I will mention, would be provided with such surfaces. In this specification the word "pillar" will be used to indicate any member of the kind stated to which the invention is applicable, and the word "beam" will be used to indicate any plough or other beam to which the pillar is to be clamped.

The diagonally set U shaped bolt already employed as a colter clamp may be retained in carrying out this invention, but the narrow link through holes in which the bolt limbs extend is not sufficient and is dispensed with.

In the drawings herewith suitable construction is illustrated, but the invention is not limited to minor details; and matter may be retained in accordance with what is claimed hereinafter, notwithstanding modifications, additions, or omissions of parts.

Figure 1 is a side elevation of the head of a colter pillar clamped to a beam. Figure 2 is a plan of the parts in Figure 1. Figure 3 shows parts of Figure 2. Figure 4 is a front view of the construction in Figure 1. Figure 5 shows parts of Figure 1. Figure 6 shows an elevation on the other side of Figure 1. Figure 7 shows a fulcrum link modified from the form shown in Figures 2 to 6. Figure 8 is a modification of Figure 4. In various figures portions are omitted or broken out to show other parts clearly.

In these views 1 is a beam, and 2 is a pillar to be clamped to it. 3 is a two limbed or U shaped bolt, having transversely extending limbs 4, 5, one limb being located above and the other below beam 1. These limbs have screw threaded ends, and are fitted with nuts or the like $4^a$, $5^a$ which bear upon a plate 6 of suitably enlarged area having holes through which the limbs 4, 5 extend, one hole being shown at an upper corner of bearer plate 6, and the other at a diagonally opposite corner of plate 6, at respective points where the plate projects above and below beam 1.

In cases in which holes are mentioned in this specification but in which slots may be substituted with like results it is to be understood that slots are likewise meant.

Plate 6 also has an upper corner or part having a screw threaded hole 7 or the like, through which extends a set screw 8 above beam 1, the screw end bearing against pillar 2 at $8^a$. This set screw may carry lock nuts 9.

There is another screw threaded hole, 10, or the like in a lower corner or part of bearer plate 6. Through hole 10 there extends below beam 1 a set screw 11 which bears against pillar 2 at $11^a$, and which may carry lock nuts 12 or the like. To place set screws as indicated the plate 6 must extend opposite the pillar above and below beam 1, and no perforation or alteration of the ordinary beam or pillar is necessary if the latter has surfaces on which the set screws can bear.

Plate 6 may be enlarged and have more than one upper set screw hole 7, and more than one lower set screw hole 10, to allow of selection when locating the set screws; more than two set screws may if desired be employed simultaneously.

In order to form a fulcrum or pivoted bearing for the pillar a distance piece is provided between it and the beam. This distance piece is shown as a link 13 having end eyes $13^a$, the bolt limbs 4, 5 extending through these eyes and holding the link obliquely in place. The pillar can rock on the fulcrum during its adjustment before being fixed by tightening the set screws which are made to project equally or unequally from adjustment plate 6, to produce the desired set of the pillar or colter to give it the inclination or twist adapted to the farmer's requirements.

The farther set screw 8 forces the pillar head back from bearing plate 6 above the fulcrum the closer will the pillar be to that plate below the fulcrum, so that set screw 11 will be less deeply set.

In Figure 8 the link is of the form in Figure 7, that is thicker at one end 14 than at the other, and this facilitates setting the colter with a twist so that its lower end will be adjusted in a transverse plane.

15 shows a face of the pillar which is made visible in Figure 8 by such a setting and is not seen in Figure 4. It is seen in full in Figure 1. It is obvious that the fulcrum member could be modified in other ways also and still act. In Figure 8 the point of screw 11 is partly broken away to show other parts clearly.

16 is a filler of a space between a clamp limb as 4 and the near surface $2^a$ of the pillar. This filler is not essential when the other parts of the clamp resist displacement. The filler may vary in form but is shown as a four sided block perforated and threaded on limb 4. Its hole is not central, but the sides of the block are at different distances from it so that, according to the space to be filled, the filler is rotated until a suitable side bears against surface $2^a$. This distance piece is not in itself new.

Bearer plate 6 could be located at either side of beam 1 by making suitable modifications.

Having described this invention, what is claimed by Letters Patent is:—

1. For clamping a colter head or pillar to a beam, a plate having holes receiving limbs of a diagonally set bolt, the respective limbs of which extend above and below the beam, the plate having upper and lower holes to receive set screws above and below the beam to bear against and to adjust the pillar.

2. A beam having a pillar clamped to it with a pivotal distance piece between the beam and the pillar, the clamping means being a bolt having limbs extending transversely of the pillar and beam and fastened to an adjustment plate which carries set screws extending transversely of the beam, and bearing on the pillar.

3. An apertured bearer plate, a clamping bolt, means to fasten limbs of the bolt to the plate so as to hold a beam and a pillar, a fulcrum piece between the beam and pillar, screw threaded holes in the plate, and upper and lower set screws passing through the said holes in the plate and bearing on the pillar so as to adjust the latter.

4. The combination with a device for clamping two members together, of a fulcrum carried by said device and extending between said members, said fulcrum being thicker at one end than at the other.

5. A clamping device, comprising a U-shaped bolt adapted to straddle the members to be clamped, a fulcrum piece carried by the limbs of said bolt and extending between said members, and an adjustable block carried by one limb of said bolt for maintaining said limb at a predetermined distance from one of said members.

6. A clamping device, comprising a U-shaped bolt adapted to straddle the members to be clamped, an adjustment plate for receiving the ends of said bolt, a pair of set screws carried by said adjustment plate and adapted to exert pressure on one of the clamped members, and an adjustable block carried by one limb of said bolt for maintaining said limb at a predetermined distance from one of said clamped members.

In witness whereof I have hereunto set my hand.

LOUIS HERMANN SCHULZE.